(12) United States Patent
Lebon et al.

(10) Patent No.: US 8,820,259 B2
(45) Date of Patent: Sep. 2, 2014

(54) PENDULAR SYSTEM FOR TRANSPORTING A CIVIL ENGINEERING STRUCTURE IN AN AQUATIC MEDIUM

(75) Inventors: Jean-Daniel Lebon, Saint Germain en Laye (FR); Erik Mellier, Versailles (FR)

(73) Assignee: Soletanche Freyssinet, Rueil Malmaison (FR)

( * ) Notice: Subject to any disclaimer, the term of this patent is extended or adjusted under 35 U.S.C. 154(b) by 18 days.

(21) Appl. No.: 13/518,804

(22) PCT Filed: Dec. 22, 2010

(86) PCT No.: PCT/FR2010/052886
§ 371 (c)(1),
(2), (4) Date: Jul. 18, 2012

(87) PCT Pub. No.: WO2011/077053
PCT Pub. Date: Jun. 30, 2011

(65) Prior Publication Data
US 2012/0279434 A1    Nov. 8, 2012

(30) Foreign Application Priority Data
Dec. 24, 2009  (FR) .................................. 09 59607

(51) Int. Cl.
*B63B 35/44*    (2006.01)
(52) U.S. Cl.
USPC ........................................................ 114/267

(58) Field of Classification Search
USPC ........................................... 114/267; 405/203
IPC ....................................................... B63B 35/34
See application file for complete search history.

(56) References Cited

U.S. PATENT DOCUMENTS 5,651,709 A * 7/1997 Nandakumar et al. ............ 441/5
2008/0245286 A1  10/2008 Adamo

FOREIGN PATENT DOCUMENTS

EP        1 101 935 A2    5/2001
WO    WO 03/066425 A1    8/2003

* cited by examiner

*Primary Examiner* — Stephen Avila
(74) *Attorney, Agent, or Firm* — Mckenna Long & Aldridge LLP

(57) ABSTRACT

A method for transporting a civil engineering structure including a mast in an aquatic medium is presented. In an embodiment, the method includes fastening the civil engineering structure to at least one flotation unit, moving the civil engineering structure and the connected flotation unit in the aquatic medium as far as a desired position. The civil engineering structure may be fastened to the flotation unit in a region situated above the center of equilibrium of the civil engineering structure connected to the flotation unit. The connection may be configured to uncouple the rotational movements of the flotation unit and of the civil engineering structure about at least one axis perpendicular to the longitudinal axis of the mast of the civil engineering structure.

11 Claims, 4 Drawing Sheets

PENDULAR SYSTEM FOR TRANSPORTING A CIVIL ENGINEERING STRUCTURE IN AN AQUATIC MEDIUM

This Application is a 35 U.S.C. §371 National Stage Entry of International Application No. PCT/FR2010/052886, filed Dec. 22, 2010 and claims the benefit of French Application No. 0959607, filed Dec. 24, 2009, each of which is incorporated by reference in its entirety herein.

BACKGROUND OF THE INVENTION

The invention relates to transporting a civil engineering structure in an aquatic medium.

For simplicity, it is common to transport a civil engineering structure by sea that is not in its finished state but is in the form of separate elements which are then assembled at sea into said civil engineering structure.

One example of such a civil engineering structure is a wind turbine. In its final assembled state, a wind turbine generally comprises a mast with a nacelle mounted on top which cooperates with a rotor accepting multiple blades.

Operations are performed to assemble the various component elements of the wind turbine into this final state.

These operations are generally complex and costly.

Such is particularly the case for the mounting of and the nacelle which is very heavy and of the blades.

This is explained by the fact that the blades are cumbersome and they have a high point of attachment on the wind turbine.

The assembly is conventionally done by first attaching some or all of the blades onto the rotor and then raising the "rotor+blades" assembly to the top of the vertically positioned mast. The lifting means necessary for this purpose, for example cranes, are heavy and complex to use.

The situation is particularly difficult for an offshore wind turbine, intended for placement in the open sea.

It is indeed usual to transport the component elements of such a wind turbine separately, then assemble them at sea.

This type of wind turbine is generally assembled as follows: the base, the mast, and if applicable the metal shaft section of the wind turbine are constructed on land, then are transported by sea while held by a crane placed on a barge, and then, once at sea, the rotor and the blades are installed on the mast to form the rotating part of the wind turbine.

Usually the rotor and mast are transported separately by sea on a transport ship. The three blades (or only two of the three blades to reduce space requirements when stored on the transport ship) are already attached to the rotor during transport. Once at sea, the rotor and the blades are lifted together for placement at the top of the mast, using cranes mounted on barges or on fixed platforms.

Such maritime assembly is relatively long, complex, and costly.

In addition, the level of safety is sometimes lower than for work on land.

Even if transporting a finished civil engineering structure by sea was envisaged, for example by completely supporting it on a boat or barge, complex work would still need to be performed at sea in order to install the civil engineering structure in its final position.

When a wind turbine is transported on its side on a barge, its installation at sea requires lifting it with a crane and raising it to the vertical for placement in its final position. Such maritime work is relatively long, complex, and costly to perform.

An object of the invention is to reduce at least some of these disadvantages.

SUMMARY OF THE INVENTION

The invention thus proposes a method for transporting in an aquatic medium a civil engineering structure comprising a mast and possibly a base, the method comprising:

associating the civil engineering structure with at least one buoyancy unit by a fastening means, moving the civil engineering structure and the associated buoyancy unit in the aquatic medium as far as a desired position, the method being noteworthy in that the fastening means is located in a region of the civil engineering structure situated above the center of equilibrium of said civil engineering structure associated with the buoyancy unit, and in that the fastening means is configured for decoupling rotational movements of the buoyancy unit and of the civil engineering structure about at least one axis perpendicular to the longitudinal axis of the mast of the civil engineering structure.

In the invention, "center of equilibrium" is understood to mean the point of application of the resultant of the forces of gravity and of buoyancy acting on the civil engineering structure during its transport by the method of the invention.

Advantageously, the method of the invention allows a stable buoyancy of the civil engineering structure, so that its transport is particularly simple.

The fastening means used in the method of the invention allows ensuring high stability for the civil engineering structure during its transport in an aquatic medium, and in particular allows compensating for the pitching and/or rolling motions of the buoyancy unit during transport.

In addition, this mode of transport simplifies the later installation of the civil engineering structure. It is sufficient to bring the civil engineering structure to directly above its final position, then to reduce its buoyancy which has the effect of lowering the civil engineering structure within the aquatic medium, possibly until its base comes into contact with the bottom of the aquatic medium.

The complex maritime work required for the transport and/or installation of the civil engineering structure can thus be reduced or even eliminated.

The invention also relates to a transport device for transporting in an aquatic medium a civil engineering structure comprising a mast, said device comprising a buoyancy unit and a fastening means for attaching the civil engineering structure to the buoyancy unit, the fastening means being located in a region of the civil engineering structure situated above the center of equilibrium of said civil engineering structure when the civil engineering structure is associated with the buoyancy unit, and the fastening means being configured for decoupling rotational movements of the buoyancy unit and of the civil engineering structure about at least one axis perpendicular to the longitudinal axis of the mast of the civil engineering structure when the civil engineering structure is associated with the buoyancy unit.

Advantageously, the fastening means allows partially or completely eliminating the accelerations that the civil engineering structure may undergo.

In the particular case of a wind turbine, the nacelle, blades, and mast may be exposed to significant accelerations during transport, which may induce significant and undesirable stresses. The requirements concerning the minimization of internal stresses in the nacelle during the transport phase are very stringent.

Advantageously, the fastening means of the invention allows reducing the acceleration and therefore the stresses on the wind turbine, particularly on the nacelle, blades and mast, during transport.

A method for transporting in an aquatic medium and/or a transport device according to the invention may additionally comprise one or more of the following optional features, individually or in any possible combination:

- the fastening means is configured so as to avoid coupling of the rotational movements of the buoyancy unit and of the civil engineering structure about at least two axes perpendicular to the longitudinal axis of the mast of the civil engineering structure;
- the at least two axes are perpendicular to each other;
- the fastening means is configured such that the angular displacement of the longitudinal axis of the mast about the center of equilibrium of the civil engineering structure associated with the buoyancy unit is less than or equal to 10°;
- the fastening means comprises a gimbal device;
- the fastening means comprises a ring surrounding the mast in a plane substantially perpendicular to the longitudinal axis of said mast, said ring being connected to said mast by a first axis of rotation substantially perpendicular to the longitudinal axis of said mast, said ring being connected to the buoyancy unit by a second axis of rotation substantially perpendicular to the first axis of rotation;
- the fastening means comprises a hydraulic bath system;
- the fastening means comprises at least two reinforcing arms attached to the civil engineering structure and each sitting on at least one piston, the pistons moving within cylinders connected to each other by an enclosed chamber filled with incompressible fluid;
- the angular displacement of the civil engineering structure is controlled by dampers attached to the buoyancy unit and to the civil engineering structure above the fastening means,
- said dampers are arranged in a plane forming an angle of between 45° and 90° with the longitudinal axis of the mast of the civil engineering structure;
- said dampers are arranged in a plane substantially perpendicular to the longitudinal axis of the mast of the civil engineering structure;
- prestressing in a direction substantially parallel to the longitudinal axis of the mast of the civil engineering structure may optionally be applied in the portion of the civil engineering structure below the center of equilibrium of the civil engineering structure connected to the buoyancy unit;
- the civil engineering structure is an offshore wind turbine intended to comprise in its final state a mast supported by a base and topped by a nacelle cooperating with a rotor suitable to receive a plurality of blades;
- the method may further comprise temporarily associating at least some blades of said plurality of blades with the mast, so that said blades extend substantially in the longitudinal direction of the mast.

BRIEF DESCRIPTION OF THE DRAWINGS

The invention will be better understood by reading the following description, provided by way of example only, and referring to the attached drawings in which.

DESCRIPTION OF EMBODIMENTS

For clarity, the various elements represented in the figures are not necessarily to scale.

The invention is intended for the transport of a civil engineering structure in an aquatic medium, for example the sea.

The civil engineering structure in question may be any type of gravitational structure. Advantageously, its height is greater than the dimensions of its base.

It may be an offshore wind turbine for example, meaning a wind turbine intended for placement in the open sea.

A non-limiting example of an offshore wind turbine is discussed below, purely for illustrative purposes.

Figure 1:
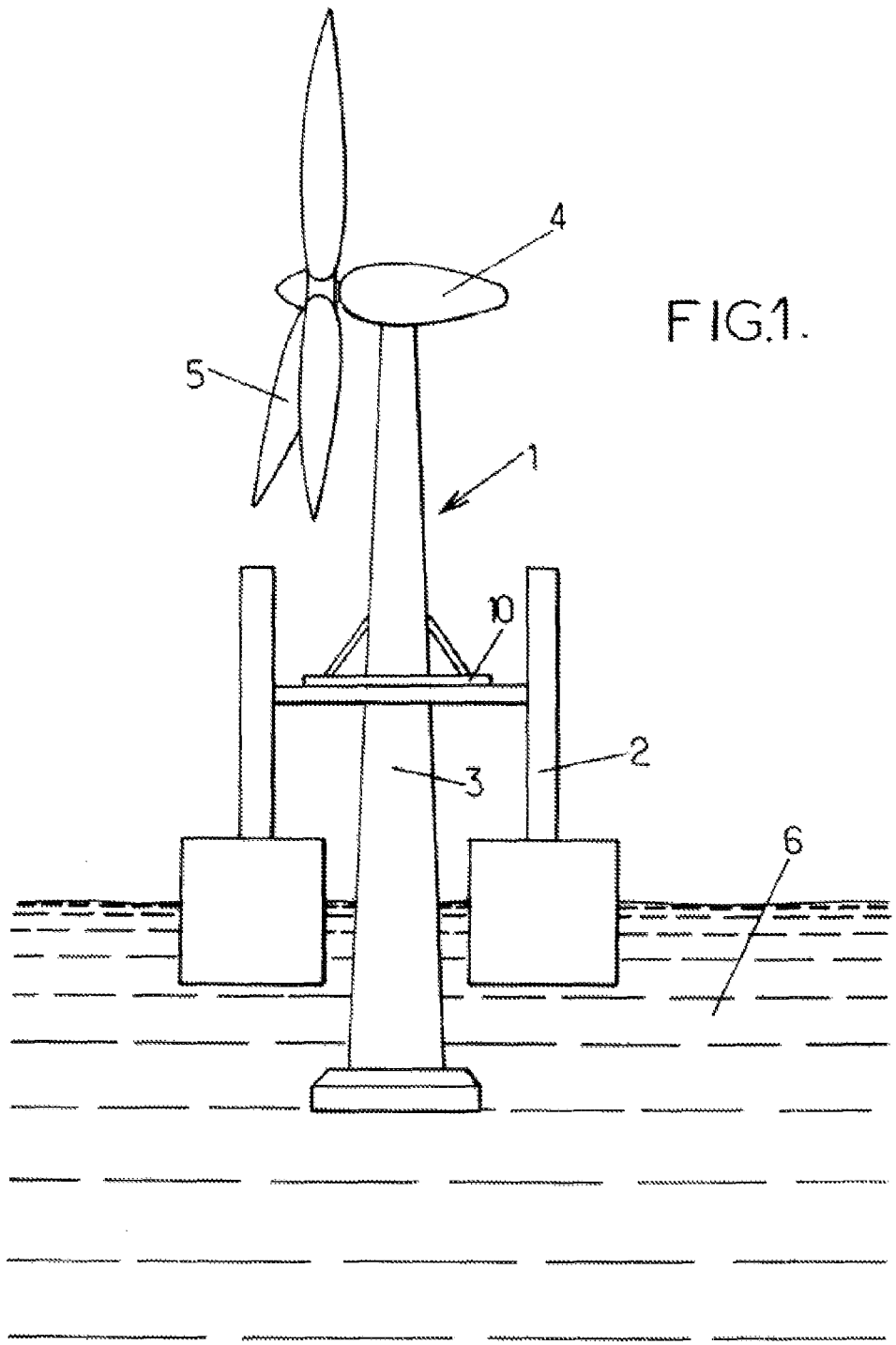
FIG. 1 is a schematic profile view of a partial longitudinal cross-section along the height of a wind turbine and an associated buoyancy unit in stable buoyancy on the ocean.

As is shown in FIG. 1, a buoyancy unit 2 is connected to the wind turbine 1 consisting of a lower portion including a mast 3 and possibly a base, topped by a nacelle 4 incorporating a rotor supporting the blades of a propeller 5, in order to ensure stable buoyancy of the wind turbine at sea.

The buoyancy unit 2 and the wind turbine 1 are connected by a fastening means 10.

The fastening means 10 is placed in a region of the wind turbine situated above the center of equilibrium of said wind turbine connected to the buoyancy unit.

The "center of equilibrium" is determined as being the point of application of the resultant of the forces of gravity and of buoyancy acting on the wind turbine 1 when this wind turbine 1 is associated with the buoyancy unit 2 and a given lower portion of the wind turbine extends into the water below the buoyancy unit 2.

The "center of equilibrium" is the same as the center of gravity of the wind turbine 1 when no portion of the wind turbine extends into the water 6.

In addition, the fastening means 10 is configured so as to decouple the rotational movements of the buoyancy unit 2 and those of the wind turbine 1 about at least one axis perpendicular to the longitudinal axis of the mast 3.

The axis perpendicular to the longitudinal axis of the mast 3 may correspond to an axis perpendicular to the direction in which the wind turbine and the buoyancy unit 2 are advancing, thus avoiding the partial or total transmission of pitching motions from the buoyancy unit to the wind turbine 1.

The axis perpendicular to the longitudinal axis of the mast 3 may correspond to an axis perpendicular to the direction in which the wind turbine 1 and the buoyancy unit 2 are advancing, thus avoiding the partial or total transmission of rolling motions from the buoyancy unit to the wind turbine 1.

In an embodiment of the invention, the fastening means may be configured so as to decouple the rotational movements of the buoyancy unit and of the civil engineering structure about at least two axes perpendicular to the longitudinal axis of the mast of the civil engineering structure.

Advantageously, the two axes may be perpendicular to each other and allow avoiding the transmission of pitching and rolling motions from the buoyancy unit 2 to the wind turbine 1.

The stability of the assembly comprising the wind turbine 1 and the buoyancy unit 2 is thus reinforced during transport in an aquatic medium.

Figure 2:
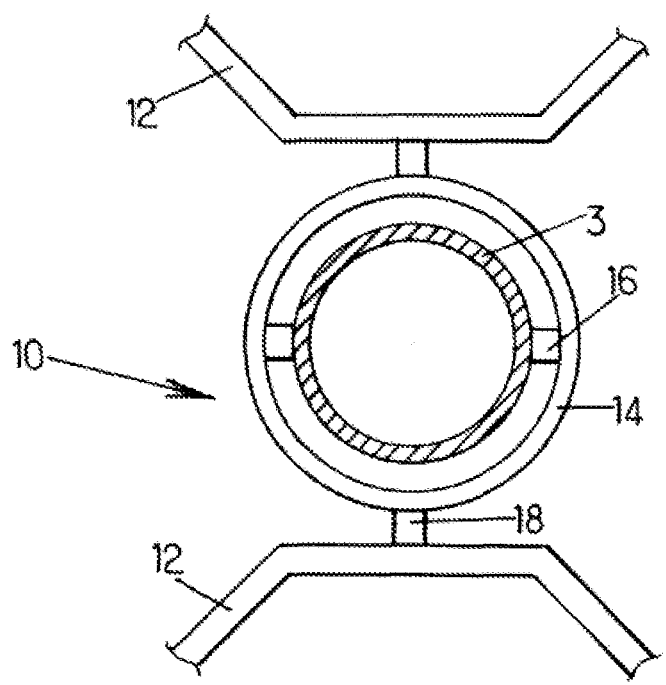
FIG. 2 is a schematic view of a fastening means according to a first embodiment of the invention.
Figure 4:
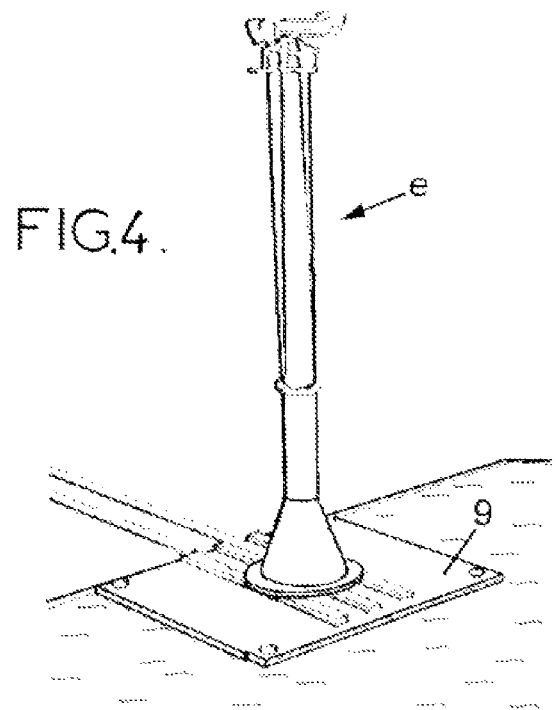
FIGS. 4 to 7 are diagrams showing a non-limiting example of the transport by sea of a wind turbine that is not in its final assembled state.
Figure 5:
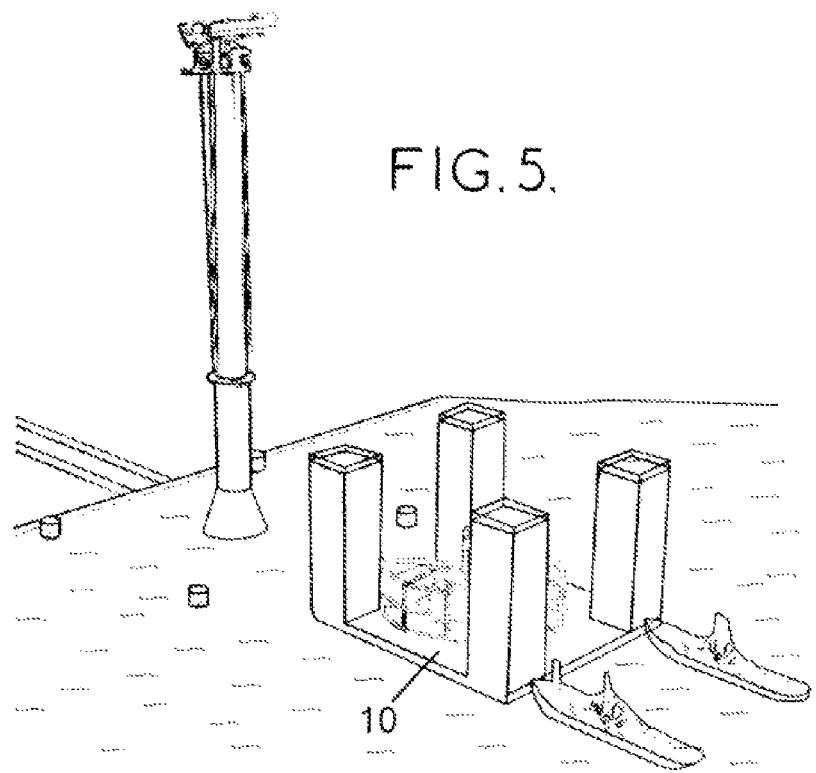
Figure 6:
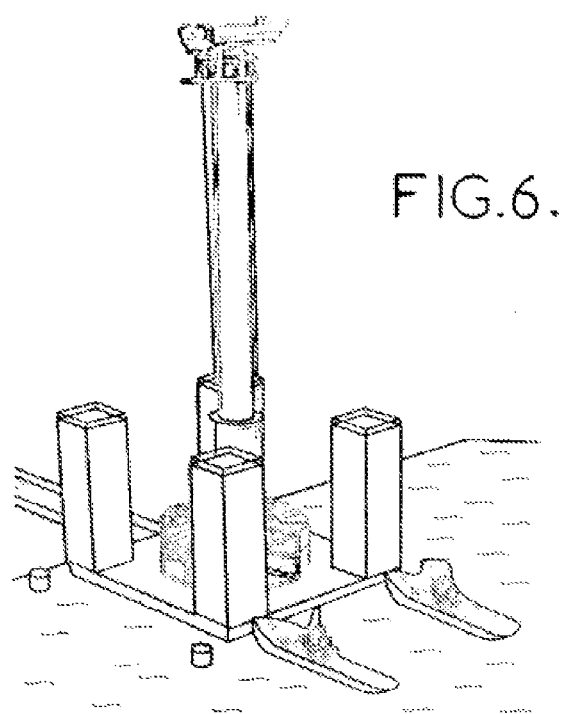
Figure 7:
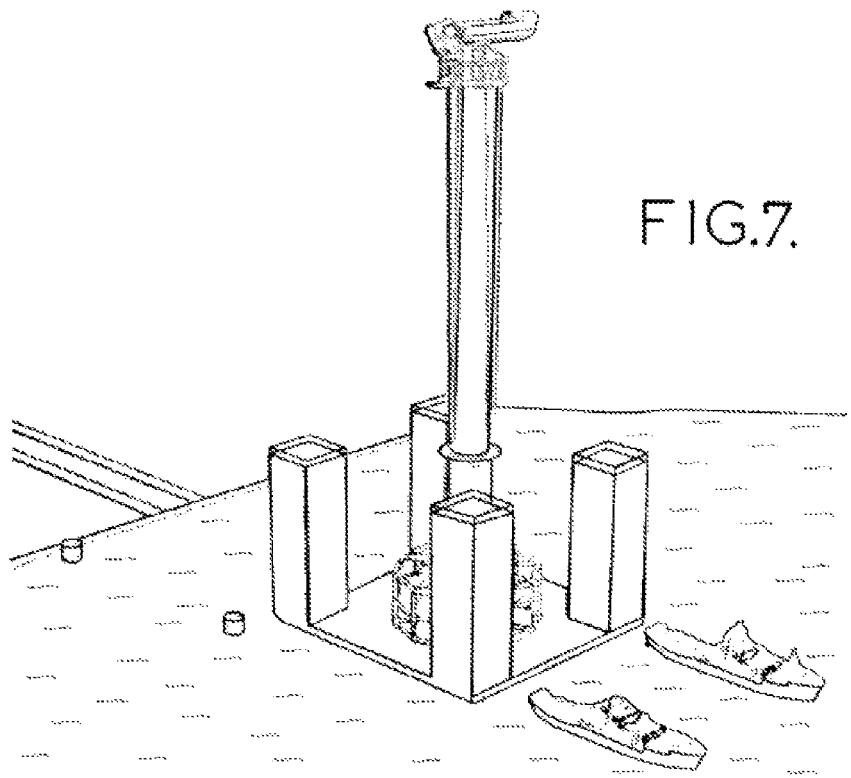

As illustrated in FIG. 2, the fastening means may comprise a gimbal device.

FIG. 2 is a cross-section along a plane perpendicular to the longitudinal axis of the mast 3 of a wind turbine 1 connected to a buoyancy unit (not represented). The plane passes through the center of equilibrium of the wind turbine 1.

The fastening means 10 represented in FIG. 2 comprises a gantry 12 arranged on the buoyancy unit (not represented) and a ring 14.

The ring 14 is positioned in a plane substantially perpendicular to the longitudinal axis of the mast 3. The ring 14 is connected to the mast 3 by a first axis of rotation 16 substantially perpendicular to the longitudinal axis of the mast 3.

The ring 14 is connected to the gantry 12 by a second axis 18 substantially perpendicular to the first axis 16 and to the longitudinal axis of the mast 3.

In one embodiment, the fastening means may comprise a second ring substantially concentric and coplanar to the first ring 14. The second ring is attached to the mast 3 and is connected to the first ring by the second axis of rotation.

Advantageously, this gimbal system allows uncoupling the pitching and rolling motions of the buoyancy unit 2 from the associated wind turbine 1. Thus the pitching and rolling motions of the buoyancy unit 2 are not transmitted to the wind turbine which remains in a substantially vertical position.

Figure 3:
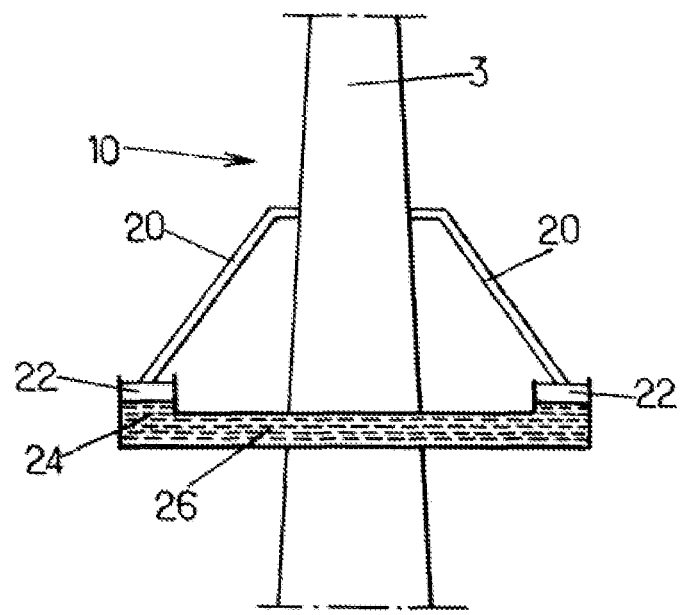
FIG. 3 is a schematic view of a fastening means according to a second embodiment of the invention.

As illustrated in FIG. 3, the fastening means may comprise a hydraulic bath system.

FIG. 3 is a cross-section of a fastening means 10 along a plane comprising the longitudinal axis of the mast 3 of a wind turbine 1 connected to a buoyancy unit by said fastening means 10.

The fastening means 10 comprises four reinforcing arms 20 attached at equally distributed locations around the mast 3 of the wind turbine. Each of the reinforcing arms 20 rests on a piston 22. The pistons 22 move within cylinders 26 connected to each other by an enclosed chamber 26 filled with an incompressible fluid, such as oil for example.

In this manner the pitching and rotational movements of the buoyancy unit 2 are not transmitted to the wind turbine 1.

In an embodiment of the invention, the fastening means may comprise at least two, for example three, reinforcing arms 20 attached at equally distributed locations around the mast 3 of the wind turbine 1.

In an embodiment of the invention, the angular displacement of the longitudinal axis of the mast 3 about the center of equilibrium of the wind turbine connected to the buoyancy unit may be limited to 10°, and preferably to 5°.

This angular displacement of the longitudinal axis of the mast may be limited and/or controlled by dampers, for example by passive or active actuators, attached to the buoyancy unit and to the wind turbine. For example, actuators may be attached between the gantry 12 and the mast 3 of the wind turbine. Preferably, these actuators are attached to the mast 3 above the equilibrium means.

In the case of passive actuators, for example hydraulic cylinders, these dampen the relative motions of the buoyancy unit and wind turbine.

In the case of active actuators, a system can continuously measure the tilt of the longitudinal axis of the wind turbine mast and adjust the travel of the actuators in real time to help maintain the wind turbine in the vertical position, i.e. the longitudinal axis of the mast in the vertical position, and thus eliminate any swaying of the wind turbine mast.

In an embodiment of the invention, prestressing in a direction substantially parallel to the longitudinal axis of the mast 3 may be applied to the lower portion of the wind turbine located below its center of equilibrium, for example below its center of gravity.

Suspending the wind turbine by a point located above its center of gravity causes tensile stresses in the lower portion of the wind turbine.

These stresses may advantageously be compensated for by adding vertical prestressing in the lower portion of the wind turbine. For example, the use of prestressing cables can reestablish a stress state in the lower structure of the wind turbine that is close to the state when the wind turbine is in service.

FIGS. 4 to 7 illustrate a non-limiting example of a method for transporting an offshore wind turbine by connecting the wind turbine to at least one float in a manner that ensures stable buoyancy of the wind turbine in the aquatic medium, with the float surrounding the wind turbine and a lower portion of the wind turbine extending below said float, and advancing the wind turbine and the associated float in the aquatic medium until the final position of the wind turbine is reached.

In this example, a civil engineering structure e comprising a mast, blades temporarily associated longitudinally with the mast, as well as a nacelle and a rotor, is first transferred onto a barge 9 at the edge of a pier (FIG. 8).

The barge 9 is lowered into the water, thus lowering the lower portion of the mast into the water. A buoyancy unit 10 is brought for attachment to the civil engineering structure e by a fastening means, to ensure stable buoyancy of the civil engineering structure (FIGS. 9 and 10).

For this purpose, the fastening means is arranged in a region of the civil engineering structure located above the center of equilibrium of said civil engineering structure connected to the buoyancy unit, a lower portion of the civil engineering structure extending into the water below the float 10.

To ensure better stability of the civil engineering structure, the fastening means is configured so as to decouple the rotational movements of the buoyancy unit and of the civil engineering structure about at least one axis perpendicular to the longitudinal axis of the mast of the civil engineering structure.

Then, the civil engineering structure and the associated float 10 are advanced in the aquatic medium, for example by towing them with ships, until the final position of the civil engineering structure is reached (FIG. 11).

As indicated below, it is in this final position of the civil engineering structure that the blades can advantageously be attached to the rotor.

To do this, only light equipment is required.

In addition, transporting the civil engineering structure with the blades placed along the mast considerably reduces its wind resistance in comparison to a wind turbine which is transported in its final assembled state. The overall stability is thus reinforced during its transport in water.

In advantageous variants of the invention which can be combined in any conceivable manner:
  the temporary association of at least some of said plurality of blades with the mast comprises temporarily attaching said blades to a support structure solidly attached to the mast, and/or
  when the nacelle is atop the mast, a relative displacement of at least some of the blades temporarily attached to the support structure and of the nacelle is done so that said blades are positioned in proximity to the rotor, and/or
  said blades are moved substantially around a longitudinal axis of the mast, and/or said blades are moved along a path arranged in the support structure, and/or the nacelle is rotated about a longitudinal axis of the mast, and/or housings for receiving the respective blades of said plurality of blades are angularly distributed around the rotor, and the rotor is rotated so that said blades are successively positioned facing the respective housings of the rotor, and/or when a blade is substantially facing the respective rotor housing, said blade is attached in said respective housing, and/or when a first blade has been attached in the respective rotor housing, the rotor is rotated so as to position a second blade facing the respective rotor housing, the rotation of the rotor causing the release of the first blade from the support structure, and/or the temporary association of at least some blades of said plurality of blades with the mast is followed by the attachment of said blades to the rotor, the release of said blades from the support structure solidly attached to the mast, and the detachment of said support structure from said mast, and/or the temporary association of at least some blades of said plurality of blades with the mast is done at a temporary position on land, and said blades are attached to the rotor once the final position of the wind turbine is reached.

The invention is not limited to the embodiments described and is to be interpreted in a non-limiting manner, encompassing any equivalent embodiment.

What is claimed is:

1. A method for transporting in an aquatic medium a civil engineering structure comprising a wind turbine on top of a mast, the method comprising:
    associating the civil engineering structure comprising the wind turbine on top of the mast with at least one buoyancy unit by a fastening means,
    moving the civil engineering structure and the associated buoyancy unit in the aquatic medium to a desired position,
    wherein the fastening means is located in a region of the civil engineering structure situated above a center of equilibrium of said civil engineering structure associated with the buoyancy unit, the fastening means being configured to decouple rotational movements of the buoyancy unit and of the civil engineering structure about at least one axis perpendicular to a longitudinal axis of the mast of the civil engineering structure, and wherein a lower portion of the mast extends into the water below the buoyancy unit while the civil engineering structure and the buoyancy unit are moved in the aquatic medium.

2. The method according to claim 1, wherein the fastening means is configured so as to decouple the rotational movements of the buoyancy unit and of the civil engineering structure about at least two axes perpendicular to the longitudinal axis of the mast of the civil engineering structure.

3. The method according to claim 2, wherein the at least two axes are perpendicular to each other.

4. The method according to claim 1, wherein the fastening means is configured such that the angular displacement of the longitudinal axis of the mast about the center of equilibrium of the civil engineering structure associated with the buoyancy unit is less than or equal to 10°.

5. The method according to claim 1, wherein the fastening means comprises a gimbal device.

6. The method according to claim 1, wherein the fastening means comprises a ring surrounding the mast in a plane substantially perpendicular to the longitudinal axis of said mast, said ring being associated with said mast according to a first axis of rotation substantially perpendicular to the longitudinal axis of said mast, said ring being associated with the buoyancy unit according to a second axis of rotation substantially perpendicular to the first axis of rotation.

7. The method according to claim 1, wherein the fastening means comprises a hydraulic bath system.

8. The method according to claim 1, wherein the fastening means comprises at least two reinforcing arms attached to the civil engineering structure and each sitting on at least one piston, said pistons moving within cylinders connected to each other by an enclosed chamber filled with incompressible fluid.

9. The method according to claim 1, wherein the angular displacement of the civil engineering structure is controlled by dampers attached to the buoyancy unit and to the civil engineering structure above the fastening means.

10. The method according to claim 1, wherein prestressing in a direction substantially parallel to the longitudinal axis of the mast of the civil engineering structure is applied in the portion of the civil engineering structure below the center of equilibrium of the civil engineering structure associated with the buoyancy unit.

11. The method according to claim 1, wherein the wind turbine has a plurality of blades, the method further comprising temporarily associating at least some blades of said plurality of blades with the mast, so that said blades extend substantially in the longitudinal direction of the mast, while the civil engineering structure and the buoyancy unit are moved in the aquatic medium.

* * * * *